United States Patent Office 3,311,598
Patented Mar. 28, 1967

3,311,598
PROCESS FOR HYDROFORMYLATING AN UN-SATURATED HYDROCARBON POLYMER
Joseph Kern Mertzweiller and Horace Marion Tenney, Baton Rouge, La., assignors to Esso Research and Engineering Company, a corporation of Delaware
No Drawing. Filed Feb. 5, 1963, Ser. No. 256,268
7 Claims. (Cl. 260—85.1)

The present invention relates to novel hydroxylated and/or carbonyl derivatives of an olefinic hydrocarbon polymer and to a process for preparing same from an olefinic hydrocarbon polymer, carbon monoxide and hydrogen wherein said process is carried out in the presence of a special transition metal complex.

It is known to prepare oxygen-containing organic compounds by reacting an organic monomeric compound containing olefinic unsaturation simultaneously with carbon monoxide and hydrogen in the presence of a catalyst consisting of a metal carbonyl. In this reaction, carbon monoxide and hydrogen are added to the olefin double bond, and inasmuch as many olefins isomerize during the reaction, mixtures of aldehydes are usually obtained. This method, however, has the inherent disadvantage of catalyst instability. Therefore, only by maintaining relatively high carbon monoxide-hydrogen pressure, i.e. 1000–2000 p.s.i.g., during the reaction can decomposition of the catalyst be avoided.

Further, the conversion of olefinic polymers via the above-mentioned oxo reaction has never been realized fully. The reason is believed to be that the conventional oxo catalyst, e.g. cobalt hydrocarbonyl, catalyzes several undesirable side reactions such as (1) formation of conjugated diolefinic linkages along the polymer chains due to the catalyst's isomerization influence, and (2) cross-linking of many polymers. Once formed, such conjugated linkages will subsequently form stable adducts with cobalt hydrocarbonyl, which reaction can be illustrated as follows:

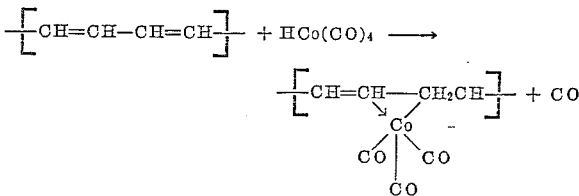

The conjugated linkages along the chain, as illustrated above, behave as conjugated diolefin monomers, e.g. butadiene, isoprene, and the like, which are known to form extremely stable adducts with cobalt hydrocarbonyl. Such adducts owe their stability to the unique type of pi bonding present therein, and indicated above by means of the arrow. This reaction, however, results in the immobilization of the active oxo catalyst employed and with negligible or no oxo activity being obtained.

Further, prior attempts to hydroformylate unsaturated hydrocarbon polymers with conventional oxo-type catalyst had other inherent disadvantages. For example, the prior art reactions were generally difficult to control and were usually accompanied by extensive cross-linking of the polymer and fouling of the equipment utilized for the reaction. The strongly acidic nature of the conventional catalyst was considered at least partially responsible for such undesirable behavior. Another possibility which appears pertinent to the process of this application is that the conventional catalyst was responsible for hydroformylating both the pendant vinyl and internally unsaturated groups often found in diolefin polymers and copolymers. From general knowledge of the cross-linking sites, and particularly vinyl polymers, the internally unsaturated sites, and particularly the functional groups derived from the internally unsaturated sites, are more likely to be involved in the cross-linking mechanisms than the pendant vinyl unsaturation and the functional groups derived from the pendant vinyls. It will be shown, however, that the catalytic complexes of this application, by virtue of unique steric factors, react predominantly on the pendant vinyl groups, and, in fact, favor the pendant vinyl groups almost exclusively when other unsaturated types are also present.

Thus, the present invention provides for novel polymers which are hydroformylation products of unsaturated hydrocarbon polymers having molecular weights of from about 300 to about 1,000,000 and wherein about 5 to 100% of said unsaturation has been replaced with —$CH_2OH$ and/or —CHO groups. The present invention therefore provides for a polymer which is the reaction product of an unsaturated hydrocarbon polymer having a molecular weight of from about 300 to about 1,000,000 and having Type I, II, III, IV, or mixtures of such types of unsaturation with carbon monoxide and hydrogen and wherein from about 5 to 100% of said unsaturation is replaced with $CH_2OH$ and/or —CHO groups.

In broad terms, the above novel oxygenated hydrocarbon polymers, i.e. hydroxylated and/or carbonyl derivatives, are prepared by reacting an olefinic polymer of a type hereinafter described with carbon monoxide and hydrogen in the presence of a hydrocarbon soluble complex which contains a transition metal selected from Group VIII of the Periodic Chart in complex bond with at least one ligand consisting of a carbon monoxide molecule, at least one biphyllic ligand which contains an atom selected from Group VA of the Periodic Chart of the Elements.

Several advantages are realized from the present invention. By the practice of the process disclosed herein, not only are the above-mentioned deficiencies overcome, but also Type I, II, III and IV olefinic linkages present in hydrocarbon polymers may be converted to hydroxy methyl groups. This conversion significantly modifies the properties of the hydrocarbon polymers employed and renders them available for a wide range of applications. Further, the complexes having a catalytic effect and, thus, which render the conversion feasible, are of unusual thermal stability and resistant to oxidation. In addition, the complexes employed in the present invention are hydrocarbon soluble, thus making a greater quantity by weight of complex available as potential catalyst source.

The process of the present invention is generally applicable to the hydroformylation of any hydrocarbon polymer having at least one ethylenic carbon to carbon bond in said polymer. Thus, polymers having Type I (pendant vinyl) unsaturation, Type II (internal cis or trans) unsaturation, Type III (tertiary) unsaturation, Type IV (tri-substituted) unsaturation or polymers having more than one of such types may be employed in the process of this invention. Certain types of unsaturation are found to be preferred over the others, however, and therefore Type I (pendant vinyl) and Type III (tertiary) unsaturation are most preferably present in the hydrocarbon polymer with Type II (internal cis or trans) and Type IV (tri-substituted) unsaturation following in that order. The hydrocarbon polymers suitable for use in the present process are further characterized by their molecular weight, viz. about 300 to about 1,000,000 and more. The polymers amenable to the hydroformylation reaction of this invention may be oily, elastomeric, plastic, and the like type polymers prepared by any suitable polymerization process. Thus, included are the Buton resins, elastomeric polybutadienes, styrene-butadiene rubber, natural rubber, and ethylene-propylene-diolefin tripolymers. The basic requirement is that the polymers contain one or more of the types of unsaturation set forth above and in sufficient quantity that they undergo reaction with the type of catalysts described herein.

It has been found that diolefin polymers or copolymers of a diolefin with a monoolefin are especially amenable to the present invention. Therefore, polybutadiene, polypentadiene, polycyclopentadiene, polyisoprene, and mixtures, or copolymers of one or more of these diolefins and the like are examples of preferred polymers.

Examples of the preferred copolymers of diolefins with monoolefins contemplated by the present invention are butadiene-styrene copolymers, pentadiene-styrene copolymers, isoprene-styrene copolymers, and also copolymers of the diolefins with aliphatic monoolefins, methyl styrene, and the like.

Especially amenable as starting polymers in the present invention are commercial polybutadienes or copolymers of butadiene and styrene of molecular weights in the range of about 300 to about 4,000, for example, Buton 100 of molecular weight 3500–4000 and Buton 150 of molecular weight 1500–2000.

The hydrocarbon polymers employed in the present invention may generally be prepared by any method known to the art, for example, by the use of a sodium or lithium alkyl or free radical catalyst.

The polymers are generally employed in an inert hydrocarbon medium which may be either paraffinic or aromatic-type solvents, the latter being preferred. The polymer may also be employed without a diluent.

The hydrocarbon soluble complexes used as catalysts in the process of the present invention are oxo-type catalysts and can be represented by the following formulae:

(I) 

and (II) 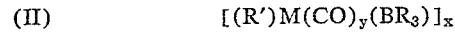

where in both Formula I and Formula II, M is a transition metal selected from the group consisting of iron, cobalt and rhodium, and preferably is cobalt; B is a Group VA atom selected from the group consisting of phosphorus and arsenic, and preferably is phosphorus; R is a radical containing from 1 to 20, and preferably 1 to 6, carbon atoms and is chosen from the group consisting of alkyl and alkoxy; and in Formula II, R' represents a pi bonded conjugated diolefin or allylic structure containing 3 to 6 carbon atoms; $x$ is 1 or 2 and $y$ is 1 or 2 with the proviso that when $x$ is 1 then $y$ is 2, and when $x$ is 2 then $y$ is 1.

The preferred forms of the complexes employed in the process of the present invention may be represented by the following formulae:

(III) 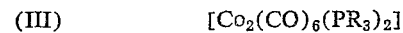

and (IV) 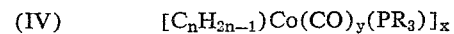

where in both Formula III and Formula IV, R is a radical containing from 1 to 6 carbon atoms and is chosen from the group consisting of alkyl and alkoxy, and in Formula IV, $n$ is an integer from 3 to 6, and $x$ and $y$ are as defined above.

With regard to the complexes employed in the present invention, it should be noted that some of these catalytic species may be isolated in a stable crystalline form which has unique and unusual properties. Further, all of these active catalyst species are extremely soluble in both hydrocarbon and polar solvents and in the latter solvents exhibit the conductivity of a typical weak electrolyte. However, the infrared spectrum of each of the catalysts is the same in all solvents in which it has been measured, thereby indicating no reaction with the solvent.

It should also be noted that properties and catalytic behavior of the complexes can be greatly influenced by the nature of the R group in the biphylic ligand. In this regard, steric factors are believed to be particularly important and, for this reason, alkyl groups are preferred to aryl groups. The analyses and physical properties of the catalytically active complexes are best explained by means of phosphorus bridging groups in the molecule and it is these prosphorus bridging groups which confer the solubility properties and the steric properties necessary for high catalytic activity and unusual conductivity, and stability behavior, and absence of cross-linking tendencies of these catalyst systems. Examples of the possible structures involving bridging phosphorus groups are:

(I) 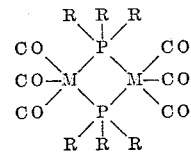

and (II) 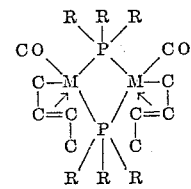

In accordance with the present invention, the transition metal which is present in the catalyst complex of Formula I is a metal of Group VIII of the Periodic Chart of the Elements and is chosen from the group consisting of iron, cobalt and rhodium with cobalt being especially preferred for use in the complex.

The complex also contains one or more biphylic ligands which contain an atom found in Group VA of the Periodic Chart. Suitable for use is trivalent phosphorus or arsenic with phosphorus being especially preferred for use. It is found that the entire group is not suitable for use in the catalyst complexes of the present invention and, hence, are excluded from use. For example, nitrogen has been suggested as being a useful modifier for oxo reactions involving polymer feeds. However, strong nitrogen bases are known to disproportionate dicobalt octacarbonyl as follows:

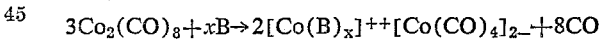

Salts of the type shown above are insoluble in olefin feeds and oxo products and are not catalysts except as they are in equilibrium with $HCo(CO)_4$ via reaction with $H_2$ under pressure. Less basic nitrogen compounds, e.g. amides, quite surprisingly have been found to give hydrocarbon insoluble species with $Co_2(CO)_8$ and are believed to be similar to types shown above. With polymer feeds, these species either do not promote reaction, or at more severe conditions, lead to the type of cross-linking characteristic of the conventional oxo catalyst.

The three valences of the atom which is present in the ligand can be saturated by an aliphatic alkyl group or alkoxy group containing from 1 to about 20 carbon atoms, preferably from 1 to about 6 carbon atoms, with 1 carbon atom in said group being especially preferred. The order of preference starts with the group having the least number of carbon atoms, i.e. methyl, and decreases with the increase in the number of carbon atoms in said group. It is found that groups other than aliphatic, for example, aromatic, cycloaliphatic, etc., are not suitable for use in the catalyst complexes of the instant invention. The biphylic ligands, therefore, included within the scope of the present invention are the phosphines, phosphites, phosphonites, phosphinites, the arsines, arsites, and the arsenites, with the phosphines and phosphites being especially preferred.

Additional and unexpected advantages result from the presence of the pi bonded diolefin ligand in the diolefin adduct complex structure of Formula II, supra. Thus the tendency to form this type of structure by using a polymer reactant chain which normally deactivates the catalyst is negatived by using the olefinic monomer as hereinbefore shown. It has also been determined reasonably well from infrared spectra that the diolefin modified complex undergoes some further changes under reaction conditions. Thus, it is believed that this transition involves reaction of the type:

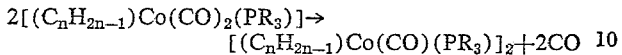
$$2[(C_nH_{2n-1})Co(CO)_2(PR_3)] \rightarrow [(C_nH_{2n-1})Co(CO)(PR_3)]_2 + 2CO$$

It should be understood, however, that the scope of the instant invention should be in no way restricted in view of the above proposed formula.

It should be noted here, too, that the diolefin adduct complexes employed in the present invention are not true species in view of the change in structure and IR spectrum change referred to above.

Preparation of the complexes employed in the process of the present invention is described more fully in copending applications, Ser. No. 256,258 and Ser. No. 256,260 of Mertzweiler and Tenney, filed Feb. 5, 1963 and now abandoned.

In broad terms, the hydroformylation reaction of the present invention is effected by intimately contacting an olefinic hydrocarbon polymer with carbon monoxide and hydrogen in the presence of a complex hereinbefore described at hydroformylation temperature and pressure. The particular conditions selected to be employed will be dependent on the reaction product desired. For example, a wide variety of hydroformulated products may be produced by the practice of the present invention characterized by at least three variables, viz. (1) hydroxyl group content, (2) carbonyl (aldehyde) group content, and (3) residual unsaturation content. Thus, control of the type of functionality and unsaturation may be achieved by the specific catalyst and reaction condition employed, i.e. temperature, $H_2$ and CO partial pressure, etc.

The reaction may be performed at pressures of from 100 to 3000 p.s.i.g., preferably 500 to 1500 p.s.i.g. Higher pressure, of course, may be employed if desired.

The reaction temperatures employed are in the range of from 200° F. to 500° F., preferably 300° F. to 400° F.

The reaction time is from 30 minutes to 5 hours, preferably 1 to 2 hours.

The molar ratio of hydrogen to carbon monoxide is not especially critical and may be varied to some extent. Suitably, the ratio employed will be at least 1:1. It has been found, however, that by increasing the $H_2/CO$ ratio to 3:1, the rate of reaction, as well as the yield of carbonylated product, may be increased although ratios up to 10:1 or higher may be employed.

Ratios of complex to polymer to be hydroformylated may be varied from 0.1 to 10 wt. percent, based on transition metal, or so as to achieve a homogeneous solution. Generally, larger quantities of catalyst complex will produce a higher reaction rate; however, an amount of complex so as to supply 2.5% by weight or less of cobalt based on the polymer is preferable, and from 0.01 to 0.2 wt. percent of cobalt, based on polymer, is especially preferable for the process of the present invention.

It should be noted that the reaction rate (oxygen content vs. time) is directly related to the catalyst concentration at constant temperature and pressure. Both temperature and pressure, however, can be varied so as to compensate for reduced catalyst concentration. The effect of pressure, for example, is striking and it has been found that by increasing the pressure from 600 to 1200 p.s.i.g. in hydroformylation with the phosphine ligand catalyst, a three-fold reduction in catalyst concentration for the same reaction rate is permitted.

The novel polymers of the present invention are hydroformylation products of unsaturated hydrocarbon polymers having molecular weights of from about 300 to about 1,000,000 and wherein about 5 to 100% of said unsaturation has been replaced with —$CH_2OH$ and/or —CHO groups. Thus, the present invention provides for a polymer which is the reaction product of an unsaturated hydrocarbon polymer having a molecular weight of from 300 to about 1,000,000 and having Type I, II, III or IV, or mixtures of such types of unsaturation with carbon monoxide and hydrogen wherein from about 5 to 100% of said unsaturation is replaced with $CH_2OH$ and/or —CHO groups. Especially preferred are the reaction products of diolefin polymers having a molecular weight range of about 500 to 100,000 and copolymers of diolefins with monoolefins having a similar molecular weight range.

Highly useful polymers are obtained by hydroxylation and/or hydrocarbonylation of polybutadiene or butadiene-styrene copolymers which contain at least 10%, and preferably 50–80%, of the unsaturation present as pendant vinyl groups, resulting from 1,2-addition of butadiene during polymerization. These preferred products have a molecular weight range of 500–500,000 and have 5 to 100% of the unsaturated linkages replaced by —$CH_2OH$ and/or —CHO groups. These new compositions of matter are further characterized in that all the hydroxyl groups are primary. Further, the oxygen content of these polymers, the predominant portion of which is present as primary alcohol groups, is generally in the range of 0.5 to 15% by weight.

The ability to introduce reactive functional groups, such as hydroxyl and carbonyl groups, into unsaturated polymers having the broad molecular weight range hereinbefore set forth offer broad areas for the application of the resulting hydroformylation products. For example, the hydroformylated products of this invention may be employed as plasticizers for resins, such as vinyl-type resins, coating materials, adhesives and as hydroxyl-containing component in the preparation of polyurethane and other types of foams.

In the following examples, Examples 1 to 21, all the reactions were carried out in a 300 cc. high pressure autoclave fitted with a magnetic drive agitator. The magnetic drive is a completely sealed system which permits pressure tight operation and following of the progress of the reactions by measurements of the pressure changes. The polymer feeds and catalysts were dissolved in aliphatic or aromatic hydrocarbon solvents; Buton polymer concentrations were in the range of 25 to 50%, while the elastomeric polymer concentrations were 7 to 12%, limited by viscosity of the solutions. The autoclave was purged, pressured cold with synthesis gas (ca. 1.0–1.5/1 $H_2/CO$) and brought to reaction temperature. Facilities were made available for sampling during the reaction.

*Example 1*

A 300 cc. stirred autoclave was charged with 100.5 gms. of a 32% solution of a commercial butadiene-styrene copolymer (Buton 100) in hexane and 4.5 gms. of 2-butenyl cobalt dicarbonyl tributyl phosphine catalyst. The mixture was completely homogeneous. The autoclave was purged and pressured to 500 p.s.i.g. with synthesis gas having an $H_2/CO$ ratio of about 1.5/1. The temperature was increased and maintained at 380° F. and the pressure was at 520 p.s.i.g. Rapid gas absorption occurred. After one hour on conditions, a small sample was withdrawn; centrifugation gave two liquid layers which were subjected to semiquantitative examination by infrared. The upper phase was fairly fluid, dark colored, and contained most of the catalyst (5.1 micron band). There was little or no absorption at 2.9 microns (hydroxyl), 5.8 microns (carbonyl) and 9.4 microns (primary alcohol). This upper layer, however, contained appreciably less olefin absorption (6.10, 10.05, 10.30 and 10.95 microns) than the feed. This is attributed to a loss in polymer content and not to hydrogenation. The lower layer was quite viscous and not as dark colored as the upper layer. There was a strong 2.9 micron and 9.4 micron band, indicating appreciable primary alcohol content. There was slight absorption at 5.8 microns (carbonyl). Most of the Type I olefin (6.1, 10.05 and 10.95 microns) had disappeared, but appreciable amounts of Type II olefin (10.3 microns) remained, indicating that the Type I olefin reacts faster than the Type II olefins.

The reaction was continued for a total of 3 hours, at which time gas absorption had almost ceased. An aliquot of product was separated into its two phases by centrifugation and the supernatant upper phase removed. The upper layer contained less than 10% of the polymer and showed little or no absorption in the 2.9 and 9.4 micron regions. The lower phase was washed once with hexane and twice with pentane. These three stages of washing removed most (~80%) of the catalyst. The viscous liquid was heated at about 150° F. to drive off most of the pentane. The very viscous, amber colored residue showed intense absorption bands at 2.9 and 9.4 microns, some absorption at 5.8 microns. Only the trace amounts of absorption were noted at the olefin position. It is estimated that better than 95% of the Type I unsaturation and better than 90% of the Type II unsaturation was converted in the oxo reaction. The polymer was found to have a hydroxyl number of 152 and a molecular weight of 4480. This corresponds to about 12 hydroxyl groups per mole.

showed medium hydroxyl and carbonyl group absorption, and was definitely elastomeric.

Natural rubber represents Type IV unsaturation and was the least reactive of the high polymers which underwent reaction. It was necessary to break down the crepe rubber by hot milling prior to hydroformylation in order to obtain a usable solution.

About 0.8% oxygen was introduced, principally as hydroxyl, but with a small amount of carbonyl functionality present. The product was elastomeric.

Example 9

The 300 cc. of autoclave was charged with 97.4 grams of a hexane solution of a polymer (intrinsic viscosity 2.7) prepared by terpolymerization of ethylene, propylene and methylene norbornylene with a catalyst consisting of vanadium, oxychloride and aluminum triethyl. The solids concentration was about 6%, and it contained about 3% methylene norbornylene incorporated in the tripolymer. The catalyst consisted of 8 gms. of a catalyst solution prepared by heating 20 gms. of the insoluble catalyst precursor $[Co(CO)_3(PBu_3)_2]^+[Co(CO)_4]^-$ slurried in 100 gms. hexane at 385° F. under 430–480 p.s.i.g. of 1/1 $H_2/CO$ synthesis gas for 35 minutes. The autoclave was pressured to 1100 p.s.i.g. with 1/1 $H_2/CO$ synthesis gas and heated rapidly to 380–385° F. whereupon the pressure rose to 1400 p.s.i.g. The pressure dropped to 1340 p.s.i.g. in 15–20 minutes, and no further significant pres-

Examples 2 to 4

Conditions:
32–50 wt. percent polymer in n-hexane
195° C. (383° F.) 2 hour reaction
500–1200 p.s.i.g. syn. gas (1.5/1 $H_2$/CO)[1]

| Example No. | Polymer Feed | Catalyst System | Cat. Wt. Percent (Co) on Reaction Medium | Product Analyses [2] | | | |
|---|---|---|---|---|---|---|---|
| | | | | W. Percent $O_2$ | OH No. | CO No. | Mol. Wt. |
| 2 | Buton 150 [3] | Butenyl Phosphine | 0.4 | 4.50 | 66 | | 2,350 |
| 3 | Polybutadiene (800 M.W.) | do | 0.68 | 4.59 | 165 | | 1,780 |
| 4 | Buton 150 | Butenyl Phosphite | 0.30 | 4.10 | 33 | 63 | 2,525 |

[1] Phosphine catalysts run at 500 p.s.i.g., phosphite catalysts at 1000–1200 p.s.i.g.
[2] On total polymer products.
[3] A commercial polybutadiene of approximately 1800 molecular weight; approximately 70% of its unsaturation is Type I and 30% Type II.

Examples 5 to 8

Conditions:
Temp. 195° C. (383° F.)
500–800 p.s.i.g. syn. gas
(1.5/1$H_2$/CO) 2 hr. reaction time

| Example No. | Polymer Feed | Catalyst System | Product Inspections | |
|---|---|---|---|---|
| | | | Oxygen Wt. Percent [1] | Infrared [2] |
| 5 | Firestone Diene Rubber (7% in xylene) | Butenyl Phosphine Complex (1.0% in medium) | 3.46 | Strong OH, strong CO. |
| 6 | SBR No. 1502 (10% in xylene) | do | 1.32 | Medium OH, medium CO. |
| 7 | Natural Rubber [3] (7% in xylene) | do | 0.82 | Medium OH, weak CO. |
| 8 | High Unsat. Butyl (10% in xylene) | Butenyl Phosphine Complex (2% in medium) | 0.02 | No OH or CO detected. |

[1] Oxygen in product minus oxygen in feed.
[2] Film on salt plate.
[3] Crepe rubber hot milled prior to hydroformylation.

Firestone diene rubber is a high molecular weight polymer of about 70% cis-trans-1,4 and 30% 1,2-polybutadiene. Products contains 3.5–8% oxygen with strong absorption in the infrared for both hydroxyl and carbonyl groups. Most of the Type I unsaturation was consumed in the reaction, and the residual Type II unsaturation was converted to the trans form. The product containing 8% oxygen was fibrous and that with 3.5% oxygen was much more elastomeric.

Styrene-butadiene rubber contains some Type I unsaturation and this reacts rapidly, while the predominant Type II unsaturation is much less reactive. The product contained 1.3% oxygen more than the feed rubber, sure drop was noted although the reaction was continued for a total of 60 minutes. The final pressure was 1330 p.s.i.g. The oxygen content of the recovered polymers was 1.18% and was not significantly greater than that measured on the starting polymer, indicating the analysis is not sufficiently sensitive at these low levels. The polymer solution showed a fairly strong infrared absorption band at 5.8 microns (absorbency, 0.220 in a 0.4 mm. cell).

Example 10

A mixture of 100 gms. of 37.7% Buton 150 (polybutadiene ca. 1800 mol wt., 70% 1,2-addition polymer) in hexane, 10 gms. of an 8.7% solution of $Co_2(CO)_8$ in hexane (0.0051 mole Co₂(CO)₈), and 0.6 gram formamide (0.0133 mole) was premixed and charged to a 300 cc. stirred autoclave. The autoclave was pressured with synthesis gas (1.5/1 H₂/CO) to 500 p.s.i.g. and heated to 385° F. There was little or no gas absorption. After 2 hours, the product was discharged and found to contain almost all of the catalyst in the form of metallic cobalt.

The above experiment was repeated, except that the temperature was maintained at 315° F. and the pressure at 1400 p.s.i.g. A rapid gas absorption was observed. However, when a sample of liquid was withdrawn after 30 minutes, it was largely n-hexane and contained little or no polymer in solution. The run was terminated after 40 minutes and it was necessary to dismantle the autoclave to remove the cross-linked polymer which had heavily fouled the reactor internals.

It was determined from this behavior and verified in a separate experiment in which the catalyst components were mixed that the action of formamide on Co₂(CO)₈ is to form a salt [Co(HCONH₂)ₓ]⁺⁺[Co(CO)₄]₂⁻. At elevated pressures of H₂ and CO, this salt is in equilibrium with the conventional catalyst HCo(CO)₄. This behavior of the formamide is the same as is described in the literature for the action of amines and other Lewis bases on Co₂(CO)₈ and is markedly different from the ligand modifiers described in this application.

*Examples 11–16*

The following series of runs were made in the 300 cc. stirred autoclave to determine the effects of temperature, pressure and catalyst concentration on the kinetics of the hydroformylation of Buton 150 (40% xylene solution). The catalyst was prepared in the manner described in Example 9. The rate of oxygen introduction (wt. percent per minute) is taken as an index of reaction rate.

| Example No. | Reaction Conditions | | | Rate of O₂ Introduction, Wt. Percent/Minute |
|---|---|---|---|---|
| | Temp., °F. | Press., p.s.i.g. | Cat. Wt. Percent Co | |
| 11 | 350 | 600 | 0.09 | 0.033 |
| 12 | 350 | 600 | 0.17 | 0.056 |
| 13 | 385 | 600 | 0.17 | 0.092 |
| 14 | 385 | 600 | 0.05 | 0.028 |
| 15 | 385 | 1,200 | 0.05 | 0.080 |
| 16 | 385 | 1,200 | 0.025 | 0.046 |

In the above runs, particular care was taken to maintain the H₂/CO ratio constant at 1/1. This was done by maintaining a flow of gas thru the 300 cc. autoclave at a rate of about 0.7 liter per minute. In the above examples, the reaction rates are approximately linear functions of catalyst concentration at the different conditions of temperature and pressure. The effect of pressure is very pronounced (compare Examples 14 and 15).

*Examples 17–19*

The following hydroformylation runs were made in the 300 cc. autoclave to determine the effect of concentration of the 2-butenyl cobalt dicarbonyl triethyl phosphite catalyst. The runs were made at 350° F., 1200 p.s.i.g. (1/1 H₂/CO) with 40% (xylene) solution of the Buton 150 polymer and the flow-thru gas system.

| Example No. | Catalyst Conc. Wt. Percent Co in Medium | Wt. Percent O₂ on Polymer at Minutes | | | |
|---|---|---|---|---|---|
| | | 30 | 60 | 90 | 120 |
| 17 | 0.10 | 4.35 | 6.55 | | |
| 18 | 0.05 | 4.30 | 5.84 | 6.75 | |
| 19 | 0.025 | 2.44 | 3.04 | | 4.00 |

The type of functionality introduced into the polymer under these conditions is predominantly aldehyde groups. However, there are two distinct types of aldehyde groups introduced by means of the phosphite modified catalysts. A doublet aldehyde band (5.75 and 5.85 micron maxima) is observed in the infrared. With the phosphine catalyst modifications, only the 5.75 micron band is observed. The 5.85 micron band may be due to a conjugated system associated with the isomerization activity of the catalyst.

*Example 20*

A catalyst solution of [Co₂(CO)₆(P(OET)₃)₂] was prepared by treating 8.1 grams of the hydrocarbon insoluble liquid layer from treating Co₂(CO)₈ with a slight molar excess of P(OET)₃ slurried with 75 grams n-heptane at 348° F. under 570–590 p.s.i.g. synthesis gas for 60 minutes. A homogeneous solution was obtained having a strong infrared band at about 5.0 microns.

A hydroformylation run was carried out in the 300 cc. autoclave using 130 grams of 40% Buton 150 (commercial polybutadiene ca. 1800 mol. wt.) in xylene and 13 grams of the above catalyst solution. The run was carried out for 2 hours at 350° F. and 1100–1250 p.s.i.g. of 1/1 H₂/CO synthesis gas. The catalyst was less active than the butenyl carbonyl phosphite complex (Examples 17–19); gas absorption rate was about half that obtained at an equivalent molar concentration of butenyl cobalt carbonyl phosphite catalyst. The product showed the doublet aldehyde bands at 5.75 and 5.85 microns in the infrared. The oxygen content of the product was low, less than 1%.

*Example 21*

A catalyst was prepared similar to methods described elsewhere for the butenyl cobalt carbonyl phosphine type, except that isoprene was used in place of butadiene in its preparation. This gives a methyl butenyl cobalt dicarbonyl tributyl phosphine catalyst complex.

A hydroformylation run was made using 7 grams of the above catalyst solution and 130 grams of Buton 150 in xylene; the equivalent cobalt concentration in the reaction mixture was 0.14 wt. percent. The reaction was carried out at 348° F. and about 950 p.s.i.g. with 1/1 H₂/CO synthesis gas for 150 minutes. The product contained 5.5 wt. percent oxygen, principally as aldehyde, with a single carbonyl band at 5.75 microns. The oxygen introduction rate was 0.040 wt. percent per minute.

What is claimed is:

1. The method of preparing oxygen-containing polymers which comprises reacting an unsaturated hydrocarbon compound having a molecular weight of from about 500 to about 1,000,000 with carbon monoxide and hydrogen in the presence of a hydrocarbon soluble complex of the following general formula:

$$[(R')M(CO)_y(BR_3)]_x$$

wherein M is a transition metal selected from the group consisting of iron, cobalt and rhodium, B is a Group VA atom selected from the group consisting of phosphorus and arsenic, R is a radical containing from 1 to about 20 carbon atoms and is chosen from the group consisting of alkyl and alkoxy, R' is a pi bonded conjugated diolefin containing from 3 to 6 carbon atoms, x is an integer from 1 to 2, y is an integer from 1 to 2, with the proviso that when x is 1, then y is 2, and when x is 2, then y is 1.

2. The method of claim 1 in which the unsaturated hydrocarbon polymer contains a type of unsaturation chosen from the group consisting of pendant vinyl, internal cis or trans, tertiary, tri-substituted and mixtures thereof.

3. The method of claim 1 in which the unsaturated hydrocarbon polymer is selected from the group consisting of diolefin polymers and copolymers of a diolefin with a monoolefin.

4. The method of claim 1 in which the complex is employed in amounts of from 0.01 to 0.2 wt. percent of cobalt based on polymer.

5. The method of preparing oxygen-containing compounds which comprises reacting a hydrocarbon polymer containing olefinic unsaturation with carbon monoxide and hydrogen in the presence of a catalytic amount of a hydrocarbon soluble complex having the formula:

$$[(C_nH_{2n-1})Co(CO)_y(PR_3)]_x$$

wherein R is a radical containing from 1 to 6 carbon atoms and is chosen from the group consisting of alkyl and alkoxy, $n$ is an integer of from 3 to 6, $x$ is an integer of from 1 to 2, and $y$ is an integer of from 1 to 2, with the proviso that when $x$ is 1, then $y$ is 2, and when $x$ is 2, then $y$ is 1.

6. The method of claim 5 in which the polymer is a butadiene-styrene copolymer.

7. The method of claim 5 in which the polymer is a butadiene polymer having a molecular weight of from about 500 to about 4000.

References Cited by the Examiner

UNITED STATES PATENTS

| | | | |
|---|---|---|---|
| 2,751,322 | 6/1956 | Bost | 260—85.1 |
| 3,102,899 | 9/1963 | Cannell | 260—604 |
| 3,159,188 | 9/1964 | Eisenmann et al. | 260—604 |
| 3,168,553 | 2/1965 | Slaugh | 260—439 |
| 3,131,621 | 1/1966 | Slaugh | 260—85.1 |
| 3,234,283 | 2/1966 | Finch et al. | 260—604 |

JOSEPH L. SCHOFER, *Primary Examiner.*

W. HOOVER, *Assistant Examiner.*